United States Patent
Czaplewski (10) Patent No.: US 12,180,379 B2
(45) Date of Patent: *Dec. 31, 2024

(54) REVERSE PHOTOCHROMIC INKS INCLUDING ENCAPSULATED REVERSE PHOTOCHROMIC COLORANTS, AND ASSOCIATED METHODS AND WRITING INSTRUMENTS

(71) Applicant: Sanford L.P., Atlanta, GA (US)

(72) Inventor: Kenneth Czaplewski, Westmont, IL (US)

(73) Assignee: Sanford, L.P., Atlanta, GA (US)

( * ) Notice: Subject to any disclaimer, the term of this patent is extended or adjusted under 35 U.S.C. 154(b) by 323 days.

This patent is subject to a terminal disclaimer.

(21) Appl. No.: 17/761,771

(22) PCT Filed: Sep. 23, 2020

(86) PCT No.: PCT/US2020/052213
§ 371 (c)(1),
(2) Date: Mar. 18, 2022

(87) PCT Pub. No.: WO2021/061769
PCT Pub. Date: Apr. 1, 2021

(65) Prior Publication Data
US 2022/0372322 A1 Nov. 24, 2022

Related U.S. Application Data

(60) Provisional application No. 62/904,914, filed on Sep. 24, 2019, provisional application No. 62/904,905,
(Continued)

(51) Int. Cl.
*C09D 11/00* (2014.01)
*C09D 11/17* (2014.01)
(Continued)

(52) U.S. Cl.
CPC .............. *C09D 11/50* (2013.01); *C09D 11/17* (2013.01); *C09D 11/18* (2013.01)

(58) Field of Classification Search
CPC .......... C09D 11/50; C09D 11/17; C09D 11/18
(Continued)

(56) References Cited

U.S. PATENT DOCUMENTS

| 5,017,225 A | 5/1991 | Nakanishi et al. |
| 2012/0038718 A1 | 2/2012 | Kazmaier et al. |

(Continued)

FOREIGN PATENT DOCUMENTS

| WO | 20150166901 A1 | 11/2015 |
| WO | 2020006153 A2 | 1/2020 |

OTHER PUBLICATIONS

Tinuvin 477-DW Technical Data Sheet (Basf), Dec. 2010, pp. 1-3.
(Continued)

*Primary Examiner* — James E McDonough
(74) *Attorney, Agent, or Firm* — Eversheds Sutherland (US) LLP (57) ABSTRACT

Reverse photochromic ink formulations containing encapsulated reverse photochromic colorant, methods of erasing reverse photochromic ink formulations including encapsulated reverse photochromic colorants by exposing them to UV light, and writing instruments including a writing tip portion connected to a light-shielding tubular member or refill and a reverse photochromic ink formulation including encapsulated reverse photochromic colorant are provided herein.

19 Claims, 6 Drawing Sheets

Related U.S. Application Data filed on Sep. 24, 2019, provisional application No. 62/904,900, filed on Sep. 24, 2019.

(51) Int. Cl.
  *C09D 11/18* (2006.01)
  *C09D 11/50* (2014.01)

(58) Field of Classification Search
  USPC .................. 106/31.01, 31.13, 31.6, 31.92
  See application file for complete search history.

(56) References Cited

U.S. PATENT DOCUMENTS

| | | |
|---|---|---|
| 2014/0002539 A1 | 1/2014 | Goto et al. |
| 2016/0024321 A1* | 1/2016 | Wang ............... C09D 11/50 523/122 |
| 2016/0068746 A1 | 3/2016 | Owen et al. |
| 2017/0005819 A1 | 1/2017 | Brandt |
| 2019/0054387 A1* | 2/2019 | Davidson ............ C09J 129/04 |

OTHER PUBLICATIONS

International Search Report of PCT/US2020/052196 dated Dec. 31, 2020.

Zhou et al., "Preparation and application of melamine-formaldehyde photochromic microcapsules", Sensors and Actuators B: Chemical, vol. 188, Jul. 25, 2013, pp. 502-512.

* cited by examiner

REVERSE PHOTOCHROMIC INKS INCLUDING ENCAPSULATED REVERSE PHOTOCHROMIC COLORANTS, AND ASSOCIATED METHODS AND WRITING INSTRUMENTS

CROSS REFERENCE TO RELATED APPLICATIONS

This application is a 35 U.S.C. § 371 national stage application of PCT Patent Application No. PCT/US2020/052213, filed Sep. 23, 2020, which claims priority benefit of U.S. Provisional Application No. 62/904,914, filed Sep. 24, 2019, U.S. Provisional Application No. 62/904,900, filed Sep. 24, 2019, and U.S. Provisional Application No. 62/904,905, filed Sep. 24, 2019, the disclosures of which are incorporated by reference herein in their entirety.

BACKGROUND

This disclosure generally relates to ink formulations, and associated methods and writing instruments, and more specifically relates to reverse photochromic inks including encapsulated reverse photochromic colorants, and methods and writing instruments for using the same.

Reverse photochromic inks have been developed; however, reverse photochromic colorants may not be soluble in solvents such as water, which limits the solvent systems which can be used with these reverse photochromic colorants. Additionally, in some cases, other components of the ink, such as the solvent, binder, or other additives, have been found to interfere with the activator or bleaching agent's ability to render the dye colorless upon exposure to UV light.

Accordingly, there is a need for improved reverse photochromic inks.

DETAILED DESCRIPTION

Reverse photochromic ink formulations including encapsulated reverse photochromic colorants, methods of using (e.g., erasing) reverse photochromic ink formulations including encapsulated reverse photochromic colorants, and writing instruments including reverse photochromic ink formulations including encapsulated reverse photochromic colorants are provided herein. In some embodiments, reverse photochromic ink formulations including reverse photochromic colorants encapsulated in breakable, UV-shielding shells are provided herein.

As used herein, the term "UV light" is used broadly to refer to an electromagnetic radiation having a wavelength of from about 10 nm to about 400 nm, and includes vacuum-UV, UV-C, UV-B, and UV-A light.

As used herein, the term "reverse photochromic" is used broadly to refer to a substance which is initially colored or opaque and which, upon exposure to light, becomes transparent or translucent. In some embodiments, the measured L* value of a reverse photochromic substance is initially smaller, prior to substantial exposure to light, and is larger upon exposure to light. In some embodiments, the light is UV light.

As used herein, the term "colorant" is used broadly to refer to a substance that imparts a desired color to an ink formulation. For example, a colorant may be a dye or pigment.

As used herein, the term "erased" is used broadly to indicate that at least a portion of the colored components of an ink formulation has been removed from a substrate, or have been rendered colorless or transparent. As used herein, the phrase "substantially erased" is used broadly to indicate that substantially all of the colored components of an ink formulation have been removed from a substrate, or have been rendered colorless or transparent.

As used herein, "permanently colored" is used broadly to indicate that at least a portion of the colored components of an ink formulation remain on the substrate, have not been rendered colorless or transparent, and will not be substantially erased by further exposure to UV light.

As used herein, "ultraviolet absorber" is used broadly to refer to a substance that can undergo light-induced oxidation through free-radical generation when exposed to UV light, or any substance that can absorb UV light. For example, ultraviolet absorbers include, but are not limited to, 2-hydroxy-benzophenone ("BP") and its derivatives, oxalanilide ("Ox") and its derivatives, 2-(2-hydroxyphenyl)-benzotriazole ("BTZ") and its derivatives, hydroxyphenyl-s-triazine ("HPT") and its derivatives, and any combination thereof. Ultraviolet absorbers may include monomers and polymers that absorb UV light. For example, ultraviolet absorbers include, but are not limited to, 2(5-benzotriazolyl 3-t-butyl 4-methacryloxy) phenyl propionic acid, isooctyl ester; 2-(2'-Hydroxy-5'-methylphenyl)-benzotriazole; 2-(2'-Methacryloxy-5'-methylphenyl)benzotriazole; Phenyl acrylate; Phenyl methacrylate; 2-Phenylethyl acrylate; 2-Phenylethyl methacrylate; N-(Phthalimidomethyl) acrylamide; dicyclopentenyloxyethyl acrylate; 4-methacryloxy-2-hydroxybenzophenone; 2-(2'-Methacryloxy-5'-methylphenyl)benzotriazole; diallyl maleate; phenylmethacrylate; 2-phenylethyl acrylate; 2-phenylmethacrylate; phenyl acrylate; n-phthalimidomethyl)acrylamide; cinnamyl methacrylate; benzyl acrylate; including any combinations thereof, polymers thereof, or co-polymers thereof.

As used herein, "encapsulated" is used broadly to refer to a substance or core that is surrounded by a shell. For example, encapsulated materials include, but are not limited to, materials that are completely surrounded by an acrylic shell, such that the materials are isolated from any surrounding environment by the acrylic shell.

As used herein, "nanocapsules" is used broadly to refer to capsules having a maximum diameter of less than 1000 nanometers.

As used herein, "microcapsules" is used broadly to refer to capsules having a maximum diameter of from 1000 nanometers to about 1000 micrometers.

Encapsulated Reverse Photochromic Ink Formulations

Encapsulated reverse photochromic ink formulations are disclosed herein. In some embodiments, the ink formulation may contain one or more reverse photochromic colorants encapsulated in a plurality of capsules. In some embodiments, the reverse photochromic colorants may include a photochromic dye and an activator or bleaching agent that renders the dye colorless upon exposure to UV light. In some embodiments, only a portion of the reverse photochromic colorant is encapsulated in the plurality of capsules. For example, the ink formulation may contain one or more activators or bleaching agents encapsulated in a plurality of capsules, and may include a photochromic dye that is not encapsulated in a plurality of capsules. Reverse photochromic colorants manufactured by and commercially available from Spectra Group Ltd. (Ohio, USA), including: CR234-BT2B, CR234-R33, CR234-R33x2, and CR234-V4, may be used as reverse photochromic colorants in embodiments of ink formulations of the present disclosure. The CR234-BT2B colorant is initially blue and, upon exposure to UV light, transitions from blue to clear. The CR234-R33 and CR234-R33x2 colorants are initially red and, upon exposure to UV light, transition from red to clear. The CR234-V4 colorant is initially violet and, upon exposure to UV light, transitions from violet to clear. In some embodiments, the ink formulation contains the colorant in an amount of from about 20 wt. % to about 80 wt. %, for example about 20 wt. %, about 30 wt. %, about 40 wt. %, about 50 wt. %, about 60 wt. %, about 70 wt. %, or 80 wt. %, about 90 wt. %, about 90 wt. %, or any ranges therebetween.

In some embodiments, the plurality of capsules are acrylic capsules, melamine formaldehyde capsules, urea formaldehyde, ethyl cellulose, polyvinyl alcohol, gelatin, sodium alginate, or any combination thereof. In some embodiments, the capsules are nanocapsules or microcapsules.

In some embodiments, the plurality of capsules are breakable. That is, in some embodiments, the capsules may be designed to be ruptured, such as by heat or friction, thereby releasing their contents. In some embodiments, the plurality of capsules contain (i.e., are formed by) one or more ultraviolet absorbers. For example, in some embodiments, the plurality of capsules contain 2(5-benzotriazolyl 3-t-butyl 4-methacryloxy)phenyl propionic acid, isooctyl ester; 2-(2'-Hydroxy-5'-methylphenyl)-benzotriazole; 2-(2'-Methacryloxy-5'-methylphenyl) benzotriazole; Phenyl acrylate; Phenyl methacrylate; 2-Phenylethyl acrylate; 2-Phenylethyl methacrylate; N-(Phthalimidomethyl) acrylamide; dicyclopentenyloxyethyl acrylate; 4-methacryloxy-2-hydroxybenzophenone; 2-(2'-Methacryloxy-5'-methylphenyl) benzotriazole; diallyl maleate; phenylmethacrylate; 2-phenylethyl acrylate; 2-phenylmethacrylate; phenyl acrylate; n-phthalimidomethyl)acrylamide; cinnamyl methacrylate; benzyl acrylate; or combinations thereof. For example, in some embodiments, the plurality of capsules contain polymers or co-polymers of 2(5-benzotriazolyl 3-t-butyl 4-methacryloxy) phenyl propionic acid, isooctyl ester; 2-(2'-Hydroxy-5'-methylphenyl)-benzotriazole; 2-(2'-Methacryloxy-5'-methylphenyl)benzotriazole; Phenyl acrylate; Phenyl methacrylate; 2-Phenylethyl acrylate; 2-Phenylethyl methacrylate; N-(Phthalimidomethyl) acrylamide; dicyclopentenyloxyethyl acrylate; 4-methacryloxy-2-hydroxybenzophenone; 2-(2'-Methacryloxy-5'-methylphenyl)benzotriazole; diallyl maleate; phenylmethacrylate; 2-phenylethyl acrylate; 2-phenylmethacrylate; phenyl acrylate; n-phthalimidomethyl)acrylamide; cinnamyl methacrylate; benzyl acrylate; or any combinations thereof In some embodiments, the plurality of capsules are breakable and contain one or more ultraviolet absorbers. In these embodiments, the ink may be permanently colored so long as the plurality of capsules remain unbroken. In these embodiments, the ink may be erased, for example, by first rupturing the plurality of capsules with a mechanical eraser, and then exposing the surface to UV light.

In some embodiments, the encapsulated reverse photochromic colorant is formed by the methods disclosed in U.S. Patent Publication No. 2017/0113200, entitled "Encapsulation," the disclosure of which is hereby incorporated by reference herein in its entirety. In some embodiments, the encapsulated reverse photochromic colorant is formed by the methods disclosed in U.S. Patent Publication No. 2017/0165627, entitled "Microencapsulation process," the disclosure of which is hereby incorporated by reference herein in its entirety.

In some embodiments, the ink formulation includes a resin. In some embodiments, the resin may include a variety of synthetic resin emulsions, such as aqueous dispersions of polyacrylic acid esters, styrene-acrylate copolymers, polyvinyl acetate, ethylene-vinyl acetate copolymers, ethylene methacrylic acid copolymers, α-olefin-maleic acid copolymers, silicone resins, polyester and polyurethane, water-soluble resins such as polyvinyl alcohols, polyvinyl pyrrolidone and polyvinyl butyral, alkali-soluble resins such as styrene-maleic acid copolymers, ethylene-maleic acid copolymers and styrene-acrylate copolymers, oil-soluble resins such as ketone resins, ketone-formaldehyde resins, amide resins, alkyd resins, rosin-modified resins, rosin-modified phenol resins, phenol resins, xylene resins, polyvinyl pyrrolidone, α- and β-pinene-phenol polycondensation resins, polyvinyl butyral resins and acrylic resins.

In some embodiments, the resin is an acrylic resin. In some embodiments, the acrylic resin is a water-based acrylic resin, for example Joncryl® 67, Joncryl® 678, Joncryl® 682, Joncryl® 683, or combinations thereof, which are all available from BASF (Germany).

In some embodiments, the ink formulation includes the resin in an amount of from about 0.01 wt. % to about 50 wt. %, for example about 0.01 wt. %, about 10 wt. %, about 20 wt. %, about 30 wt. %, about 40 wt. %, or about 50 wt. %.

In some embodiments, the ink formulation includes a solvent. In some embodiments, the solvent is water. In some embodiments, the solvent is one or more alcohols, for example, benzyl alcohol, ethanol, n-propanol, n-butanol, diacetone alcohol, or combinations thereof. In some embodiments, the solvent is a water-soluble organic solvent, for example, ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ethers propylene glycol monobutyl ether, ethylene glycol monomethyl ether acetate, sulfolane, 2-pyrrolidone, N-methyl-2-pyrrolidone and the like. In some embodiments, the solvent is an organic solvent, for example, naphtha, VM&P naphtha, refined solvent naphtha, petroleum sprit, xylene, methylisobutyl ketone, or butyl propionate.

In some embodiments, the ink formulation contains the solvent in an amount of from about 0.01 wt. % to about 80 wt. %, for example about 0.01 wt. %, about 10 wt. % solvent, about 20 wt. %, about 30 wt. %, about 40 wt. %, about 50 wt. %, about 60 wt. %, about 70 wt. %, about 80 wt. %, or any ranges therebetween.

In some embodiments, the ink formulation includes one or more shear-thinning imparting agents, for example, nonionic surfactants having a specific HLB value, xanthan gum, welan gum, succinoglycan (organic acid-modified heteroglycan composed of glucose unit and galactose unit, having an average molecular weight of about 100 to 8,000,000), guar gum, locust bean gum, hydroxyethyl cellulose, alkyl alginates, polymers mainly composed of alkyl methacrylate and having a molecular weight of 100,000 to 150,000, glycomannan, hydrocarbons having a gelling ability and extracted from seaweed such as agar or carrageenan, benzylidenesorbitol or derivatives thereof, crosslinking acrylic acid polymers and the like, hydrophobically-modified ethoxylated urethane (HEUR) thickeners, alkalai-swellable emulsion (ASE) thickeners, hydrophobically-modified alkali-swellable emulsion (HASE) thickeners, associative thickeners, and non-associative thickeners are used alone or mixed in combination.

In some embodiments, the ink formulation includes one or more other additives such as pigments, binders, viscosity modifiers, thixotropic agents, preservatives, lubricants, pH adjustors, antiseptics or fungicides, wetting agents, defoamers, dispersants, surfactants, humectants, biocides, and the like.

In some embodiments, the ink formulation does not contain polyvinyl alcohol, polyamide, methyl hydroxypropyl cellulose, Selvol™ 203 (commercially available from Sekisui, Japan), Selvol™ 205, Versamid® 759 (commercially available from BASF), Versamid® 917, or Tylose® PS0810001 (commercially available from Shin Etsu, Germany).

In some embodiments, the ink formulation may be configured to be delivered from a marker type writing instrument, such as a Sharpie® pen. In some embodiments, the ink formulation may be configured to be delivered from a roller ball or ballpoint pen. In some embodiments, the ink formulation may be configured to be delivered from a gel pen. In some embodiments, the ink formulation may be configured to be delivered from a writing brush pen. In some embodiments, the ink formulation may be configured to be delivered from a marker or highlighter. In some embodiments, the ink formulation may be configured to be deposited onto a substrate by dip-coating, flexo-printing, gravure printing, offset printing, inkjet printing, stamping, spraying, brushing, rolling, puffing, or any combination thereof.

Methods of Using/Erasing Encapsulated Reverse Photochromic Inks

In some embodiments, methods of using and erasing encapsulated reverse photochromic ink are provided. In some embodiments, any of the ink formulations described above is disposed on a surface (e.g., via contacting a writing instrument containing the ink formulation to the surface such that the ink is delivered from the instrument to the surface), heat is applied to the surface to break the one or more encapsulations, and then the surface is exposed to light. In some embodiments, the heat is radiant heat provided by a heat source. In some embodiments, the heat is applied by friction. In some embodiments, the friction is applied by a mechanical eraser. In some embodiments, the heat is provided by a light source. In some embodiments, the heat is provided by a laser.

In some embodiments, the surface is paper. In some embodiments, the light is ambient light, for example visible light with a wavelength of 405 nm. In some embodiments, the light is sunlight. In some embodiments, the light is UV light. The UV light has a wavelength of from about 315 nm to about 400 nm, for example about 315 nm, about 350 nm, about 400 nm, about 405 nm, and any ranges therebetween. In some embodiments, the light is provided by a portion of a writing instrument. In some embodiments, the light is provided by a source separate from the writing instrument. In some embodiments, the surface is exposed to light for a duration of from about 0.1 second to about 2 hours, for example about 0.1 seconds, about 1 second, about 5 seconds, about 20 seconds, about 1 minute, about 5 minutes, about 10 minutes, about 20 minutes, about 30 minutes, about 40 minutes, about 50 minutes, about 60 minutes, about 70 minutes, about 80 minutes, about 90 minutes, about 100 minutes, about 110 minutes, about 120 minutes, and any ranges therebetween.

In some embodiments, the ink formulations may be considered erased when each formulation would be considered erased by an average consumer. Thus, in some embodiments, determining whether an ink formulation has been erased may involve a qualitative determination.

In some embodiments, the erasure of the ink formulations described herein may be evaluated using the Likert scale, wherein write test samples may be evaluated before and after attempted erasing on a 5-point scale. According to the Likert scale, 5 represents no color change, 4 represents slight discoloration, 3 represents moderate discoloration, 2 represents severe discoloration, and 1 represents complete color elimination. In some embodiments, the ink formulations may be considered erased when they are rated with a moderate discoloration, severe discoloration, or complete color elimination according to the Likert scale.

In some embodiments, the color of an ink formulation before and after exposure to UV light may be quantitatively evaluated with a color measurement instrument. In some embodiments, the color measurement instrument may be a spectrophotometer, while in some embodiments the color measurement instrument may be a spectrodensitometer.

In some embodiments, color differences may be identified using the Commission Internationale de l'Eclairage (CIE) L*a*b* coordinates, wherein L* indicates lightness, a* is the red/green coordinate, and b* is the yellow/blue coordinate. The larger the L* value, the lighter the color, and the smaller the L* value, the darker the color. The larger the a* value, the redder the color, the smaller the a* value greener the color. The larger the b* value, the yellower the b* value, and the smaller the b* value, the bluer the color.

The color change of the ink formulation from its state before exposure to UV light ($L^*_1$, $a^*_1$, and $b^*_1$) and after exposure to UV light $L^*_2$, $a^*_2$, and $b^*_2$ can be indicated by calculating $\Delta L^*$, $\Delta a^*$, and $\Delta b^*$, according to the formulas below:

$$\Delta L^* = L^*2 - L^*1$$

$$\Delta a^* = a^*2 - a^*1$$

$$\Delta b^* = b^*2 - b^*1$$

A positive $\Delta L^*$ will indicate that the sample became lighter after exposure to UV light, while a negative $\Delta L^*$ will indicate that the sample became darker after exposure to UV light. For example, a positive $\Delta L^*$ when measuring the effect of UV light on a colored reverse photochromic ink on a white substrate may indicate that the reverse photochromic ink was lightened by exposure to UV light.

A positive $\Delta a^*$ will indicate that the sample became redder after exposure to UV light, while a negative $\Delta a^*$ will indicate that the sample became greener after exposure to UV light. For example, a positive $\Delta a^*$ when measuring the effect of UV light on a green colored reverse photochromic ink on a white substrate may indicate that the green color of the reverse photochromic ink was at least partially removed by exposure to UV light.

A positive $\Delta b^*$ will indicate that the sample became yellower after exposure to UV light, while a negative $\Delta b^*$ will indicate that the sample became bluer after exposure to UV light. For example, a positive $\Delta a^*$ when measuring the effect of UV light on a blue colored reverse photochromic ink on a white substrate may indicate that the blue color of the reverse photochromic ink was at least partially removed by exposure to UV light. As would be readily understood by one of skill in the art, measuring $\Delta a^*$ and $\Delta b^*$ may be particularly useful in evaluating the erasability of reverse photochromic inks which are initially red or blue in color.

The total color difference between all three coordinates $L^*$, $a^*$, and $b^*$ can be evaluated by calculating the total color difference, $\Delta E^*$, according to the formula below:

$$\Delta E^* = [\Delta L^{*\cdot 2} + \Delta a^{*\cdot 2} + \Delta b^{*\cdot 2}]/2$$

In some embodiments, the ink formulations may be considered erased when write test samples of the ink on a white substrate exhibit a $\Delta E^*$ value of from about 40 to about 100, a $\Delta L^*$ value of from about 1 to about 100, a $\Delta a^*$ value of from about +/−0.1 to about +/−90, a $\Delta b^*$ value of from about +/−0.1 to about +/−90, or any combination thereof, including any ranges therebetween. For example, in some embodiments, the ink formulations may be considered erased when write test samples of the ink on a white substrate exhibit a $\Delta E^*$ value of from about 40 to about 50, from about 50 to about 80, about 50, about 60, about 70, about 80, about 90, about 95, about 100, or any ranges therebetween. In some embodiments, the ink formulations may be considered erased when the write test samples of the ink on a white substrate exhibit a $\Delta L^*$ value of from about 5 to about 40, from about 40 to about 60, from about 50 to about 95, about 1, about 10, about 20, about 30, about 40, about 50, about 60, about 70, about 80, about 90, about 95, about 100, or any ranges therebetween. In some embodiments, the ink formulations may be considered erased when the write test samples of the ink on a white substrate exhibit a $\Delta a^*$ value of from about −60 to about 60, from about −60 to about −0.1, from about 0.1 to about 60, from about −25 to about −5, from about 5 to about 25, from about −60 to about −30, from about 30 to about 60, for example about −90, about −80, about −70, about −60, about −50, about −40, about −30, about −20, about −10, about 0, about 10, about 20, about 30, about 40, about 50, about 60, about 70, about 80, about 90, or any ranges therebetween. In some embodiments, the ink formulations may be considered erased when the write test samples of the ink on a white substrate exhibit a $\Delta b^*$ value of from about −90 to about −50, about 50 to about 90, about −40 to about −20, about 20 to about 40, about −20 to about −0.1, about 0.1 to about 20, about −90, about −80, about −70, about −60, about −50, about −40, about −30, about −20, about −10, about −0.1, about 0.1, about 10, about 20, about 30, about 40, about 50, about 60, about 70, about 80, about 90, or any ranges therebetween.

In some embodiments, the color of an ink formulation before and after exposure to UV light may be evaluated using the CIE $L^*C^*h$ coordinates, where $L^*$ indicates lightness, $C^*$ indicates chroma, and h is the hue angle. The color change of the ink formulation from its state before exposure to UV light ($L^*_1$, $C^*_1$, and $h_1$) and after exposure to UV light $L^*_2$, $C^*_2$, and $h_2$ can be indicated by calculating $\Delta L^*$, $\Delta C^*$, and $\Delta h$, according to the formulas below:

$$\Delta L^* = L^*_2 - L^*_1$$

$$\Delta C^* = C^*_2 - C^*_1$$

$$\Delta h = h_2 - h_1$$

In some embodiments, the ink formulations may be considered erased when the ink before and after exposure to UV light exhibits a $\Delta L^*$ value of from about 1 to about 100, $\Delta C^*$ value of from about 0.1 to about 90, a $\Delta h$ value of from about 1° to about 360°, or any combination thereof, including any ranges therebetween. For example, in some embodiments, the ink formulations may be considered erased when the write test samples of the ink on a white substrate exhibit a $\Delta L^*$ value of from about 5 to about 40, from about 40 to about 60, from about 50 to about 95, about 1, about 10, about 20, about 30, about 40, about 50, about 60, about 70, about 80, about 90, about 95, about 100, or any ranges therebetween.

In some embodiments, the ink formulations may be considered erased when the write test samples of the ink on a white substrate exhibit a $\Delta C^*$ value of 0.1 to about 20, about 25 to about 70, about 75 to about 90, about 0.1, about 10, about 20, about 30, about 40, about 50, about 60, about 70, about 80, about 90, or any ranges therebetween. In some embodiments, the ink formulations may be considered erased when the write test samples of the ink on a white substrate exhibit a $\Delta h$ value of about 1°, about 30°, about 60°, about 90°, about 120°, about 150°, about 180°, about 210°, about 240°, about 270°, about 300°, about 330°, about 360°, or any ranges therebetween.

Writing Instruments

In some embodiments, writing instruments are provided. In some embodiments, the writing instruments include a writing tip portion connected to a light-shielding tubular member or refill, and any of the ink formulations described above. In some embodiments, the writing tip portion is a ballpoint. In some embodiments, the writing tip portion is a marker. In some embodiments, the writing tip portion is a brush tip. In some embodiments, the light-shielding tubular member or refill may block from about 50% to about 100% of light from contacting the ink formulation. In some embodiments, the light-shielding tubular member or refill may block anywhere from about 50% to about 100% of UV light from contacting the light formulation.

In some embodiments, the writing instrument further includes a mechanical erasing portion. In some embodiments, the mechanical erasing portion is a frictional eraser.

In some embodiments, the writing instrument further includes a UV-erasing portion. In some embodiments, the UV-erasing portion may include one or more UV light-generating elements. In some embodiments, the one or more UV light-generating elements may be an LED. In some embodiments, the UV-erasing portion is opposite the writing tip portion. In some embodiments, the UV-erasing portion includes a UV light configured to generate at least 0.250 mW/cm$^2$ of 340 nm UV light.

Figure 1:
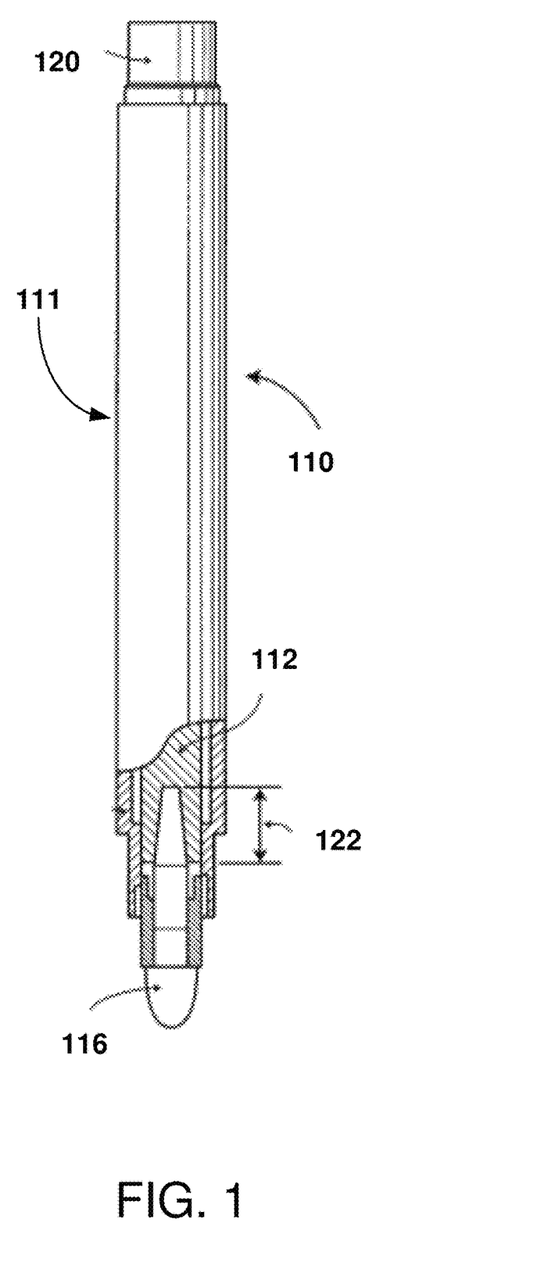
FIG. 1 is an embodiment of a marker type writing instrument including reverse photochromic ink.

FIG. 1 shows a partial cutaway view of an embodiment of a writing instrument 110 according to the present disclosure. The writing instrument 110 includes a tubular body 111 that surrounds a reservoir 112 that may house any of the reverse photochromic ink formulations described above. In some embodiments, the tubular body 111 is light-shielding. The writing instrument further includes a writing tip 116 that extends into the reservoir 112 by a distance 122. The tubular body 111 further includes a frictional eraser 120.

Figure 2:
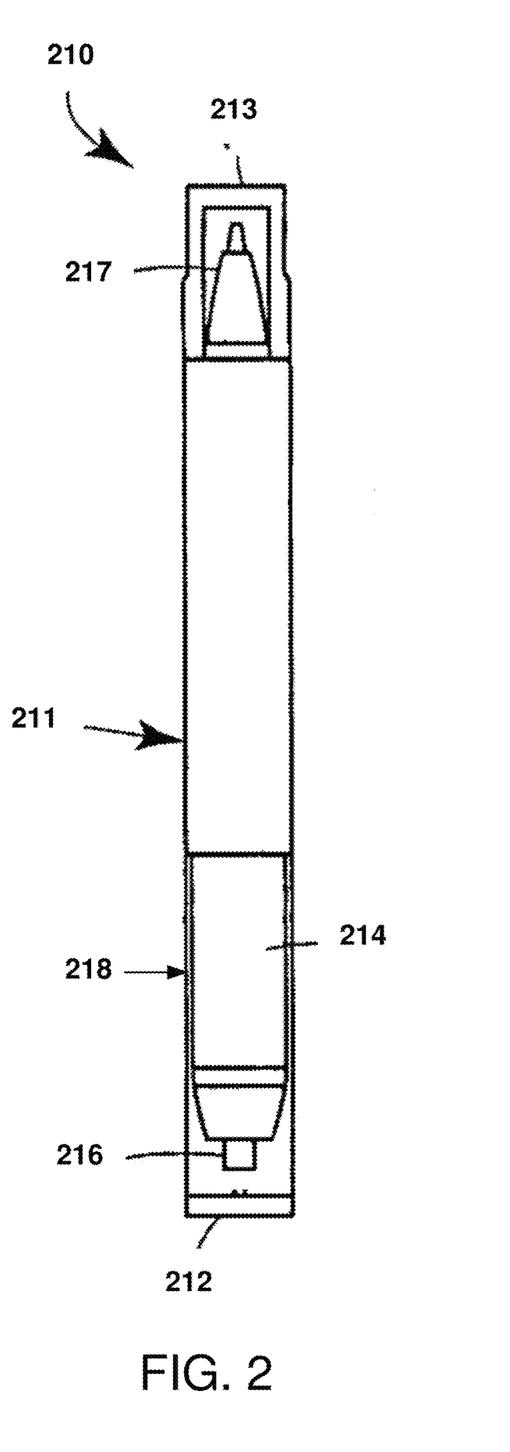
FIG. 2 is an embodiment of a ballpoint type writing including reverse photochromic ink.

FIG. 2 depicts a writing instrument 210, which includes a tubular member 211, which may house any of the reverse photochromic ink formulations described above. In some embodiments, the tubular body 211 is light-shielding. The writing instrument includes a cap 213 which is configured to removably cover the writing tip 217. The writing tip 217 may be of a roller ball type, porous tip type, or other configuration, and may or may not be retractable.

The writing instrument 210 further includes a UV-erasing portion 218, which is configured to generate UV light capable of erasing the reverse photochromic ink. The UV-erasing portion includes a battery 214, an LED 216, and a cap 212, which is configured to removably cover the UV-erasing portion 217.

Permanently Colored Reverse Photochromic Inks

While the above-described formulations provide for erasable reverse photochromic inks and associated methods and writing instruments, it should be noted that erasability of reverse photochromic systems may not always be desirable, such as when the reverse photochromic ink is used on a legal document or when the reverse photochromic ink may be inadvertently exposed to sunlight. Accordingly, there also is a need for improved methods and writing instruments for permanently colored reverse photochromic inks. Thus, ultraviolet absorbers for permanently colored reverse photochromic inks, methods of permanently coloring reverse photochromic ink formulations, and writing instruments including ultraviolet absorbers also are provided herein.

Ultraviolet Absorbers for Permanently Colored Reverse Photochromic Inks

Ultraviolet absorbers for permanently colored reverse photochromic inks are disclosed herein. In some embodiments, the ultraviolet absorbers may be provided in the form of an ultraviolet absorbing ink formulation ("UVA ink formulation").

In some embodiments, the UVA ink formulation may consist only of one or more ultraviolet absorbers. For example, in some embodiments, the UVA ink formulation may consist only of 2-hydroxy-benzophenone ("BP") and its derivatives, oxalanilide ("Ox") and its derivatives, 2-(2-hydroxyphenyl)-benzotriazole ("BTZ") and its dervatives, hydroxyphenyl-s-triazine ("HPT") and its derivatives, or combinations thereof, without any additional components. In some embodiments, the UVA ink formulation may consist only of an aqueous UV absorber dispersion based on a red shifted hydroxyphenyl-s-triazine chormophore, such as Tinuvin® 477-DW, commercially available from BASF (Germany).

In some embodiments, the UVA ink formulation contains ultraviolet absorbers in an amount of from about 1 wt. % to about 95 wt. %, for example from about 1 wt. % to about 20 wt. %, from about 1 wt. % to about 10 wt. %, about 5 wt. %, about 10 wt. %, about 15 wt. %, 30 about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, about 85 wt. %, about 90 wt. %, about 95 wt. %, or any ranges therebetween.

In some embodiments, the UVA ink formulation includes a resin. In some embodiments, the resin may include a variety of synthetic resin emulsions, such as aqueous dispersions of polyacrylic acid esters, styrene-acrylate copolymers, polyvinyl acetate, ethylene-vinyl acetate copolymers, ethylene methacrylic acid copolymers, α-olefin-maleic acid copolymers, silicone resins, polyester and polyurethane, water-soluble resins such as polyvinyl alcohols, polyvinyl pyrrolidone and polyvinyl butyral, alkali-soluble resins such as styrene-maleic acid copolymers, ethylene-maleic acid copolymers and styrene-acrylate copolymers, oil-soluble resins such as ketone resins, ketone-formaldehyde resins, amide resins, alkyd resins, rosin-modified resins, rosin-modified phenol resins, phenol resins, xylene resins, polyvinyl pyrrolidone, α- and β-pinene-phenol polycondensation resins, polyvinyl butyral resins and acrylic resins.

In some embodiments, the UVA ink formulation includes the resin in an amount of from about 0.01 wt. % to about 50 wt. %, for example about 0.01 wt. %, about 10 wt. %, about 20 wt. %, about 30 wt. %, about 40 wt. %, or about 50 wt. %.

In some embodiments, the UVA ink formulation includes a solvent. In some embodiments, the solvent is water. In some embodiments, the solvent is one or more alcohols, for example, benzyl alcohol, ethanol, n-propanol, isopropanol, n-butanol, diacetone alcohol, or combinations thereof. In some embodiments, the solvent is a water-soluble organic solvent, for example, ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ethers propylene glycol monobutyl ether, ethylene glycol monomethyl ether acetate, sulfolane, 2-pyrrolidone, N-methyl-2-pyrrolidone and the like. In some embodiments, the solvent is an organic solvent, for example, naphtha, VM&P naphtha, refined solvent naphtha, petroleum spirit, xylene, methylisobutyl ketone, or butyl propionate.

In some embodiments, the UVA ink formulation contains the solvent in an amount of from about 0.01 wt. % to about 80 wt. %, for example about 0.01 wt. %, about 10 wt. % solvent, about 20 wt. %, about 30 wt. %, about 40 wt. %, about 50 wt. %, about 60 wt. %, about 70 wt. %, about 80 wt. %, or any ranges therebetween.

In some embodiments, the UVA ink formulation includes one or more shear-thinning imparting agents, for example, nonionic surfactants having a specific HLB value, xanthan gum, welan gum, succinoglycan (organic acid-modified heteroglycan composed of glucose unit and galactose unit, having an average molecular weight of about 100 to 8,000,000), guar gum, locust bean gum, hydroxyethyl cellulose, alkyl alginates, polymers mainly composed of alkyl methacrylate and having a molecular weight of 100,000 to 150,000, glycomannan, hydrocarbons having a gelling ability and extracted from seaweed such as agar or carrageenan, benzylidenesorbitol or derivatives thereof, crosslinking acrylic acid polymers and the like, hydrophobically-modified urethane (HEUR) thickeners, alkalai-swellable emulsion (ASE) thickeners, hydrophobically-modified alkali-swellable emulsion (HASE) thickeners, associative thickeners, and non-associative thickeners are used alone or mixed in combination.

In some embodiments, the UVA ink formulation includes one or more other additives such as pigments, binders, viscosity modifiers, thixotropic agents, preservatives, lubricants, pH adjustors, antiseptics or fungicides, wetting agents, defoamers, dispersants, surfactants, humectants, biocides, and the like.

Methods of Using UVA Inks to Permanently Color Reverse Photochromic Inks

In some embodiments, methods of using UVA inks to permanently color reverse photochromic ink are provided. In some embodiments, the reverse photochromic ink formulation may be any of those described herein. For example, in some embodiments, the reverse photochromic ink formulation may consist only of one or more reverse photochromic colorants. In some embodiments, the reverse photochromic colorants may include a photochromic dye and an activator or bleaching agent that renders the dye colorless upon exposure to UV light.

In some embodiments, a reverse photochromic ink formulation, such as that of any described above is disposed on a surface (e.g., via contacting a writing instrument containing the reverse photochromic ink formulation to the surface such that the reverse photochromic ink is delivered from the instrument to the surface), and then a UVA ink formulation, such as that of any described above is disposed on the surface and on the reverse photochromic ink disposed on the surface (e.g., via contacting a writing instrument containing the UVA ink formulation to the surface such that the UVA ink is delivered from the instrument to the surface containing the reverse photochromic ink). In some embodiments, the surface is paper. In some embodiments, the reverse photochromic ink formulation and the UVA ink formulation are both provided by the same writing instrument. In some embodiments, the reverse photochromic ink formulation and the UVA ink formulation are provided by separate writing instruments.

In some embodiments, the surface is then exposed to light, but the reverse photochromic ink is not erased. In some embodiments, the light is ambient light. In some embodiments, the light is sunlight. In some embodiments, the light is UV light. In some embodiments, the UV light has a wavelength of from about 315 nm to about 400 nm. In some embodiments, the light is provided by a portion of a writing instrument. In some embodiments, the light is provided by a source separate from the writing instrument.

In some embodiments, the reverse photochromic ink formulations may be considered permanently colored when, after being exposed to UV light having a wavelength of from about 100 nm to about 400 nm for 1 hour, the reverse photochromic ink formulation would not be considered erased by an average consumer. Thus, in some embodiments, determining whether a reverse photochromic ink formulation has been erased may involve a qualitative determination.

In some embodiments, the erasure of the reverse photochromic ink formulations described herein may be evaluated using the Likert scale, wherein write test samples may be evaluated before and after attempted erasing on a 5-point scale, as described above.

In some embodiments, the color of a reverse photochromic ink formulation before and after exposure to UV light may be quantitatively evaluated with a color measurement instrument. In some embodiments the color measurement instrument may be a spectrophotometer, while in some embodiments the color measurement instrument may be a spectrodensitometer.

In some embodiments, color differences may be identified using the Commission Internationale de l'Eclairage (CIE) L*a*b* coordinates, as described above. In some embodiments, the reverse photochromic ink formulations may be considered permanently colored when write test samples of the reverse photochromic ink covered with the UVA ink on a white substrate before and after exposure to UV light exhibit a $\Delta L^*$ value of less than about 0.1, including any ranges therebetween.

Writing Instruments

In some embodiments, writing instruments are provided. In some embodiments, the writing instruments include a writing tip portion connected to a light-shielding tubular member or refill, and any of the UVA ink formulations described above. In some embodiments, the writing instrument further includes a second writing tip portion connected to the opposite end of the light-shielding tubular member or to a second refill, and a reverse photochromic ink formulation. In some embodiments, the writing tip portion is a ballpoint or rollerball. In some embodiments, the writing tip portion is a marker or highlighter. In some embodiments, the writing tip portion is a brush tip. In some embodiments, the second writing tip portion is opposite the first writing tip portion. In such embodiments, a UV-erasing portion may be provided at another location on the writing instrument body (e.g., on a side of the body).

EXAMPLES

Embodiments of the present disclosure may be better understood by reference to the following examples.

Example 1: Encapsulated Reverse Photochromic Ink Formulations

Two reverse photochromic ink formulations were prepared consisting solely of encapsulated CR234-BT2B in water. Each of the ink formulations was from about 30 wt. % to about 40 wt. % encapsulated colorant, and each of the capsules had a diameter of about 10 microns. The colorant and capsule type used in each of these formulations are detailed in Table 1 below:

TABLE 1

| Formulation No. | Colorant Type | Capsule Type |
| --- | --- | --- |
| 1 | CR234-BT2B | melamine formaldehyde |
| 2 | CR234-BT2B | acrylate |

TABLE 2

| Formulation No. | Amount of Benzyl Alcohol (g) | Resin Type | Amount of Joncryl® 67 (g) | Colorant Type | Colorant Amount (g) |
| --- | --- | --- | --- | --- | --- |
| 3 | 4.011 | Joncryl® 67 | 3.051 | CR234-BT2B | 5.058 |
| 4 | 4.002 | Joncryl® 67 | 3.008 | CR234-R33 | 7.09 |
| 5 | 4.020 | Joncryl® 67 | 3.017 | CR234-V4 | 5.0051 |

Example 2: Lightfastness of Reverse Photochromic Ink Formulations

The ink formulations of Example 1 were each placed on a drawdown bar, and drawdowns were created on paper. Then, the drawdowns were exposed to 30 seconds, 60 seconds, or 120 seconds of 365 nm UV light from a flashlight having an irradiance of from about 15 mW/cm² to about 20 mW/cm².

Figure 3:
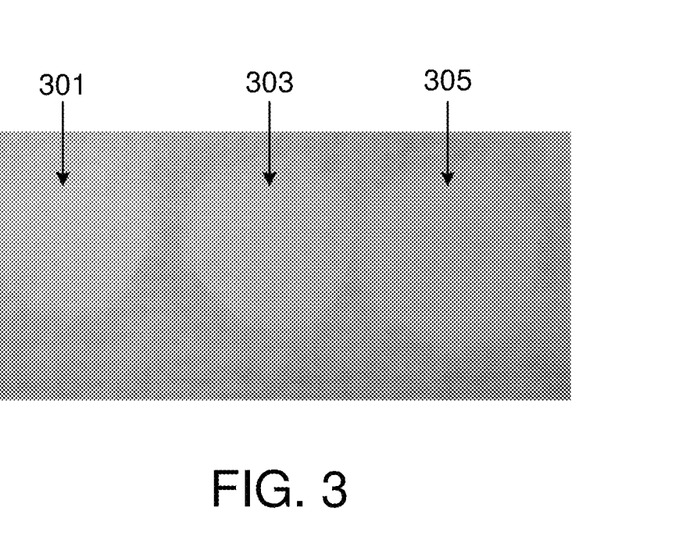
FIG. 3 is a photograph of a drawdown made using an embodiment of an ink formulation including an encapsulated reverse photochromic colorant after exposure to UV light.

A photograph of the drawdown made using formulation no. 1 after UV exposure is shown in FIG. 3. This drawdown was made on Leneta Form 3NT-41 paper using a #0 wire rod. The drawdown after exposure to 30 seconds of UV light is shown as 301, the drawdown after exposure to 60 seconds of UV light is shown as 303, and the drawdown after exposure to 120 seconds of UV light is shown as 305.

Figure 4:
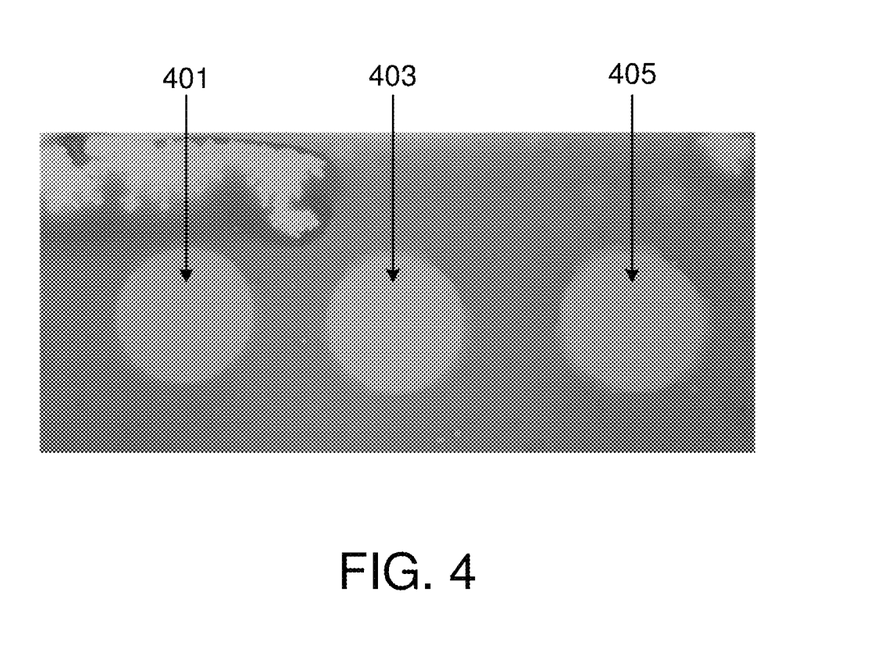
FIG. 4 is a photograph of a drawdown made using another embodiment of an ink formulation including an encapsulated reverse photochromic colorant after exposure to UV light.

A photograph of the drawdown made using formulation no. 2 after UV exposure is shown in FIG. 4. This drawdown was made on a Leneta Form 3B opacity chart using a 3 mil (76.2 micron) drawdown bar. The drawdown after exposure to 30 seconds of UV light is shown as 401, the drawdown after exposure to 60 seconds of UV light is shown as 403, and the drawdown after exposure to 120 seconds of UV light is shown as 405.

As can be seen from FIGS. 3 and 4, these encapsulated colorants erased substantially well after exposure to UV light. As can be seen from these figures, the drawdown of FIG. 4 was significantly darker than the drawdown of FIG. 3. While not intending to be bound by any particular theory, it is believed that the differences in intensity are due to differences in the thickness of the film of the ink formulations formed by each drawdown. Namely, it is believed that the film formed by the 3 mil drawdown bar is significantly thicker than the film formed by the #0 wire rod. However, as can be seen from the top of FIG. 4, this ink formulation did not perfectly wet the sealed surface of the paper in this drawdown.

Example 3: Unencapsulated Reverse Photochromic Inks

Several reverse photochromic ink formulations were prepared by adding about 3 grams of Joncryl® 67 resin to about 4 grams of benzyl alcohol and heating and mixing until the Joncryl® 67 was dissolved. Colorants were then added to this solution in 1 to 1.5 gram increments until a color intensity was achieved that rendered the laydown of the reverse photochromic inks visible on paper. The reverse photochromic ink formulations which were prepared and tested for lightfastness are shown in Table 2 below:

The various weight percentages of colorant, solvent, and resin used in the samples shown in Table 2 are shown in Table 3 below.

TABLE 3

| Sample No. | Wt % colorant | Wt % solvent | Wt % resin |
| --- | --- | --- | --- |
| 3 | 42% | 33% | 25% |
| 4 | 50% | 28% | 21% |
| 5 | 42% | 33% | 25% |

Example 4: Lightfastness of Unencapsulated Reverse Photochromic Inks

Samples of each of ink formulations 3-5 were loaded into ballpoint refill tubes and 2600/NS/10/TC/AW26 ballpen points were attached. Write traces were then generated on a Hutt write test machine according to ISO 14145-1:2016 on ISO 12757 paper using 100 gram-force (gf) for a length of 25 meters. The write test speeds and pitches were varied to optimize the appearance of the reverse photochromic inks. A cutout of these write trace is shown in FIG. 5, where the write trace made using formulation 3 is shown as 1101, the write trace made using formulation 4 is shown as 1102, and the write trace made using formulation 5 is shown as 1103.

Next, cutouts of the write traces were placed in a UV chamber that emitted UV light having a wavelength of from 300 nm to 800 nm and an irradiance of from 650 W/m² to 750 W/m² for increments of five minutes. After the first interval, formulations 11 and 12 were completely erased. However, some residual violent color remained from the write trace made using formulation 3 even after 25 minutes. A cutout of the write traces after 25 minutes in the UV chamber is shown in FIG. 6, where the completely erased write trace made using formulation 3 is shown as 1201, the completely erased write trace made using formulation 4 is shown as 1202, and the partially erased write trace made using formulation 5 is shown as 1203.

Figure 5:
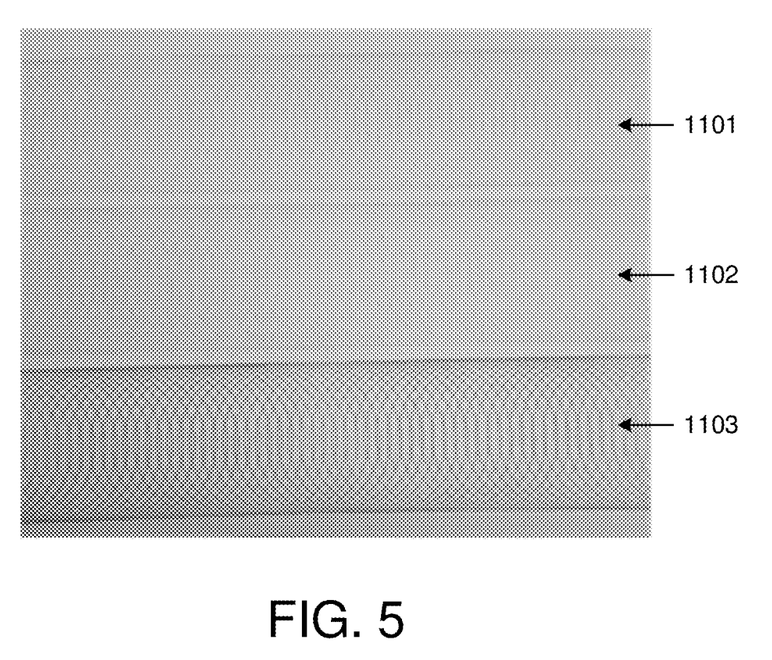
FIG. 5 is a photograph of write test samples made using three embodiments of a reverse photochromic ink formulation before exposure to UV light.
Figure 6:
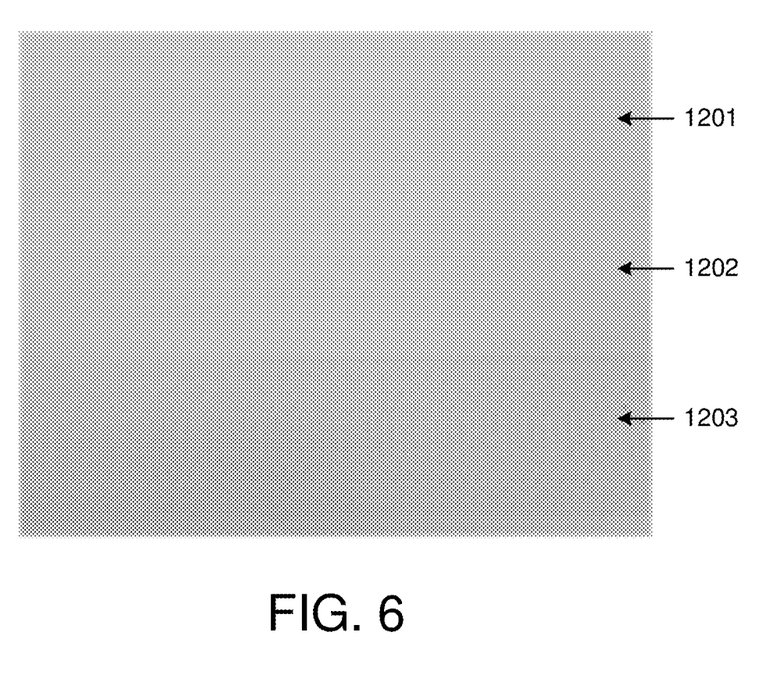
FIG. 6 is a photograph of write test samples made using the reverse photochromic ink formulations tested in FIG. 5, after exposure to UV light in a UV chamber.

As can be seen from comparing FIGS. 5 and 6, ink formulations 3-5 all erased well upon exposure to UV light in a UV chamber. However, further tests were performed to determine the lightfastness of ink formulations 3-5 upon exposure to environmental factors, such as ambient light and heat, to determine whether these inks would be inadvertently erased by ambient light or heat, which are likely to be encountered when these inks are used by consumers.

Figure 7:
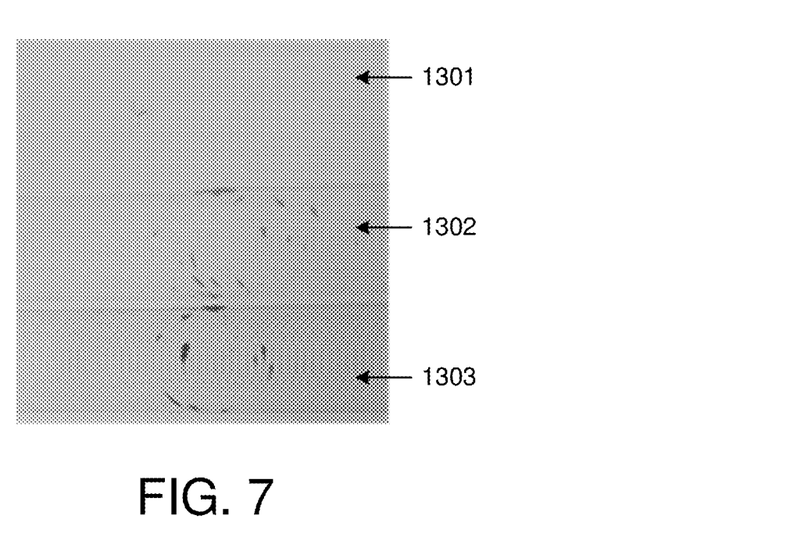
FIG. 7 is a photograph of write test samples made using the reverse photochromic ink formulations tested in FIG. 5, after exposure to ambient light for two weeks on a laboratory bench.

First, a cutout of the write trace was placed on a lab bench for two weeks, where it was exposed to the ambient fluorescent lighting conditions of the windowless lab. A photo of this cutout after two weeks on the lab bench is shown in FIG.

7, where the write traces made using formulations 3-5 are shown as 1301, 1302, and 1303, respectively. As can be seen by comparing FIG. 7 with FIG. 5, the write trace made using formulation 3 exhibited severe discoloration under these ambient lighting conditions, while the write traces made using formulations 4 and 5 exhibited only slight discoloration.

Figure 8:
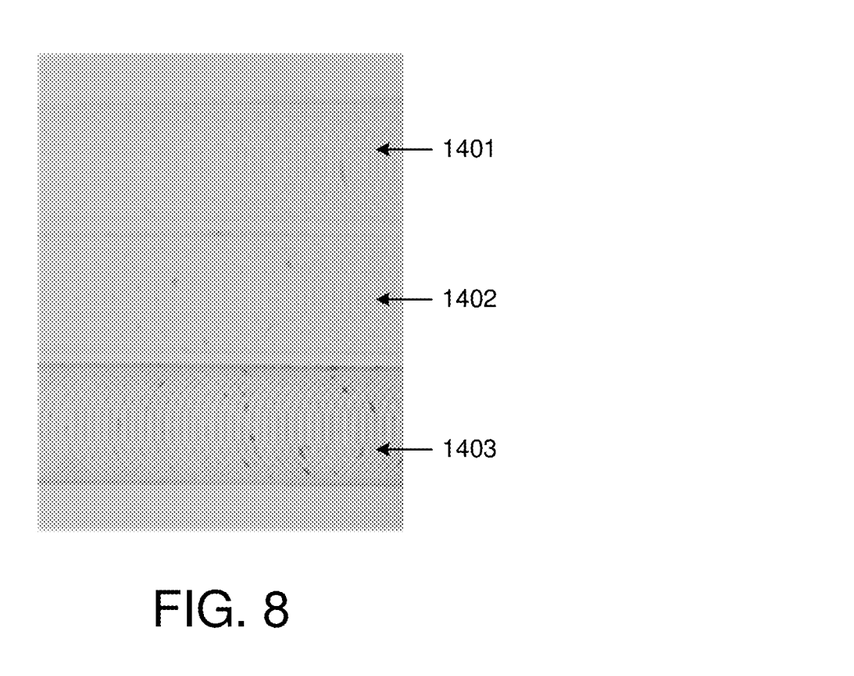
FIG. 8 is a photograph of write test samples made using the reverse photochromic ink formulations tested in FIG. 5, after being stored for two weeks in a closed laboratory drawer.

Next, a cutout of the write trace was placed in a closed lab drawer for two weeks. A photo of this cutout after two weeks in the lab drawer is shown in FIG. 8, where the write traces made using formulations 3-5 are shown as 1401, 1402, and 1403, respectively. As can be by comparing FIG. 8 with FIG. 5, no color change was observed in the write traces made using formulations 3-5.

Figure 9:
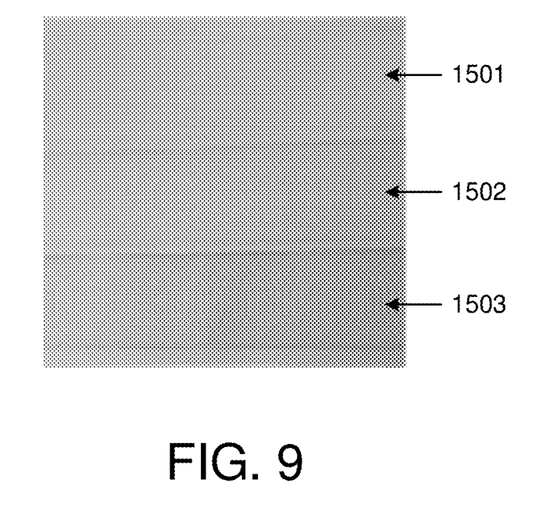
FIG. 9 is a photograph of write test samples made using the reverse photochromic ink formulations tested in FIG. 5, after exposure to ambient light for two weeks on an office wall.

Next, a cutout of the write trace was placed on an office wall, where it was exposed to the ambient lighting conditions of the office. The office lighting consisted of both fluorescent lighting and natural light from nearby windows. However, the samples were never exposed to direct sunlight through the windows, and zero UV light was measured at the location where the samples were stored. A photo of this cutout after two weeks on the office wall is shown in FIG. 9, where the write traces made using formulations 3-5 are shown as 1501, 1502, and 1503, respectively. As can be by comparing FIG. 9 with FIG. 5, the write trace made using formulation 3 exhibited moderate discoloration under these ambient lighting conditions, while the write traces made using formulations 4 and 5 exhibited only slight discoloration.

Figure 10:
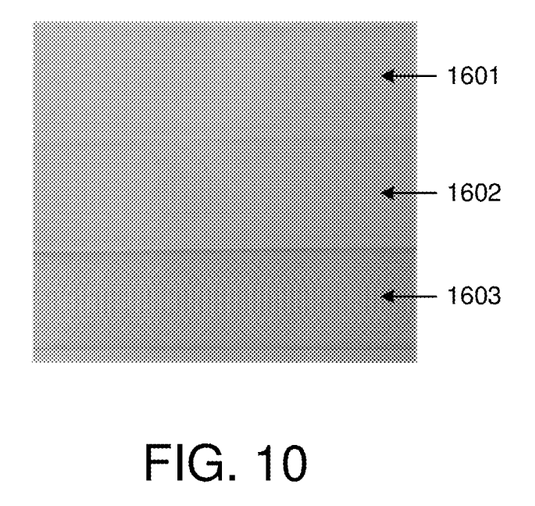
FIG. 10 is a photograph of write test samples made using the reverse photochromic ink formulations tested in FIG. 5, after being stored in a 60° C. oven for two weeks.

Finally, a cutout of the write trace was stored in a 60° C. dark windowless oven for two weeks. A photo of this cutout after two weeks on the office wall is shown in FIG. 10, where the write traces made using formulations 3-5 are shown as 1601, 1602, and 1603, respectively. As can be by comparing FIG. 10 with FIG. 5, the write trace made using formulation 3 exhibited moderate discoloration under these ambient lighting conditions, while the write traces made using formulations 4 and 5 exhibited only slight discoloration.

The color change of the write traces made using each of formulations 3-5 when exposed to each of the UV chamber, lab bench, office wall, lab drawer, and 60° C. oven was evaluated using the Likert scale, as shown in Table 4 below:

TABLE 4

| Formulation No. | UV Chamber | Lab Bench | Office Wall | Lab Drawer | 60° C. Oven |
|---|---|---|---|---|---|
| 3 | 1 | 2 | 3 | 5 | 3 |
| 4 | 1 | 4 | 4 | 5 | 4 |
| 5 | 2 | 4 | 4 | 5 | 4 |

While these ink formulations had some level of color stability under these limited tests, visible lightfastness clearly needs to be improved. In particular, these tests show that the blue ink of formulation 3 fades within a matter of days when exposed to ambient light, and the red and violet inks of formulations 4 and 5 fade within a matter of weeks.

Example 5: Permanently Colored Reverse Photochromic Ink Formulation

First, a reverse photochromic ink formulation was prepared consisting solely of CR234-BT2B colorant. The reverse photochromic ink formulation was placed on a drawdown bar, and a drawdown was created on Leneta Form 3NT-41 paper. Next, a UV-absorbing ink formulation was prepared consisting solely of Tinuvin® 477-DW. The UV-absorbing ink formulation was placed on a drawdown bar, and a drawdown of the UV-absorbing ink formulation was created on the top half of the reverse photochromic ink drawdown described above. Then, a variable power UV-LED head was used to expose the entire drawdown to 240 seconds of UV light having a wavelength of 340 nm and an irradiance of 19.5 W/cm$^2$.

Figure 11:
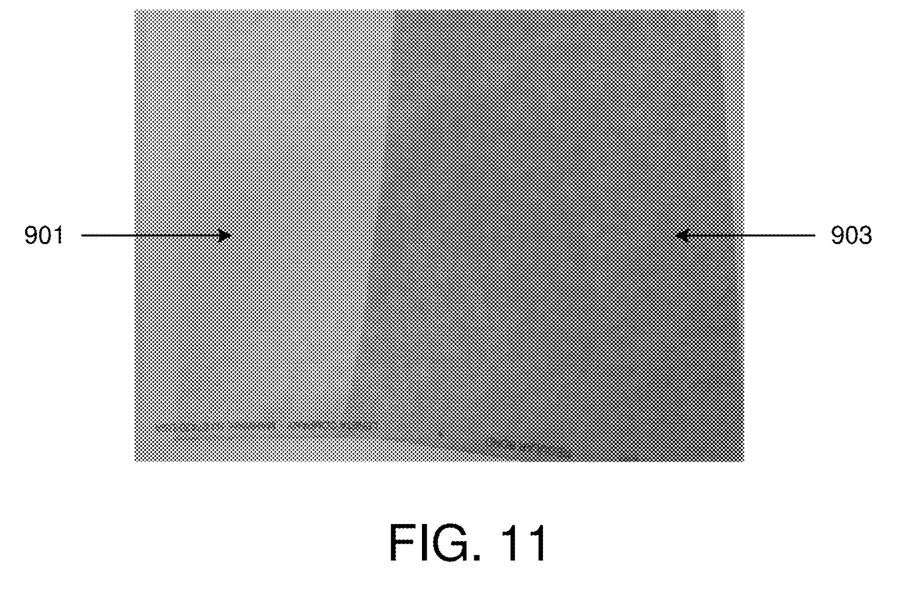
FIG. 11 is a photograph of drawdowns of an embodiment of a reverse photochromic formulation and an embodiment of a UV absorbing ink formulation.

FIG. 11 shows the drawdown after it was exposed to UV light. The reverse photochromic ink drawdown which was not treated with the UV-absorbing ink formulation is shown as 901 and the reverse photochromic ink drawdown which was covered in the UV-absorbing ink drawdown is shown as 903. As can be seen from this figure, the UV-absorbing ink drawdown successfully rendered the reverse photochromic ink drawdown permanently colored after a UV exposure, which rendered the untreated reverse photochromic ink formulation substantially erased. Thus, a UV-absorbing ink formulation may be applied over a reverse photochromic ink formulation, such as an encapsulated reverse photochromic ink formulation, to render the photochromic ink formulation permanently colored after UV exposure.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An ink formulation comprising a reverse photochromic colorant encapsulated in a plurality of capsules, wherein the plurality of capsules are formed of one or more UV absorbers.

2. The ink formulation of claim 1, wherein the plurality of capsules are nanocapsules or microcapsules.

3. The ink formulation of claim 1, wherein the capsules are formed of one or more polymers, wherein the capsules are formed of melamine formaldehyde or an acrylic polymer.

4. The ink formulation of claim 1, further comprising a solvent, wherein the ink formulation contains the solvent in an amount of from about 20 wt. % to about 80 wt. %.

5. The ink formulation of claim 4, wherein the solvent comprises water.

6. The ink formulation of claim 4, wherein the solvent comprises an alcohol, wherein the alcohol is benzyl alcohol, ethanol, n-propanol, n-butanol, diacetone alcohol, or any combination thereof.

7. The ink formulation of claim 1, further comprising a resin in an amount from about 0.01 wt. % to about 50 wt. %.

8. The ink formulation of claim 1, wherein the one or more UV absorbers comprise contain 2 (5-benzotriazolyl 3-t-butyl 4-methacryloxy) phenyl propionic acid, isooctyl ester; 2-(2'-Hydroxy-5'-methylphenyl)-benzotriazole; 2-(2'-Methacryloxy-5'-methylphenyl) benzotriazole; Phenyl acrylate; Phenyl methacrylate; 2-Phenylethyl acrylate; 2-Phenylethyl methacrylate; N-(Phthalimidomethyl) acrylamide; dicyclopentenyloxyethyl acrylate; 4-methacryloxy-2-hydroxybenzophenone; 2-(2'-Methacryloxy-5'-methylphenyl) benzotriazole; diallyl maleate; phenylmethacrylate; 2-phenylethyl acrylate; 2-phenylmethacrylate; phenyl acrylate;

n-phthalimidomethyl) acrylamide; cinnamyl methacrylate; benzyl acrylate; or combinations thereof.

9. A method of erasing ink comprising:
disposing an ink formulation comprising a reverse photochromic colorant encapsulated in a plurality of capsules on a surface, wherein the plurality of capsules are formed of one or more UV absorbers;
rupturing at least a portion of the plurality of capsules; and
exposing the surface to UV light, wherein the rupturing at least a portion of the plurality of capsules occurs before exposing the surface to UV light.

10. The method of claim 9, wherein rupturing the at least a portion of the plurality of capsules comprises applying heat to the surface.

11. The method of claim 9, wherein the UV light comprises 340 nm UV light or 365 nm UV light.

12. The method of claim 9, wherein exposing the surface to UV light comprises exposing the surface to less than 11,000 mJ/cm2 of 340 nm UV light, or less than 100,000 mW/cm2 of 340 nm UV light.

13. The method of claim 9, further comprising disposing a UV absorbing formulation on the ink formulation disposed on the surface, prior to exposing the surface to UV light, wherein the UV absorbing formulation comprises a UV absorber.

14. The method of claim 13, wherein the UV absorbing formulation contains the UV absorber in an amount of from about 1 wt. % to about 20 wt. %.

15. The method of claim 13, wherein the UV absorber comprises 2-hydroxy-benzophenone, oxalanilide, 2-(2-hydroxyphenyl)-benzotriazole, hydroxyphenyl-s-triazine ("HPT"), any derivatives thereof, or any combination thereof.

16. The method of claim 13, wherein the UV absorbing formulation further comprises a solvent in an amount of from about 20 wt. % to about 80 wt. %.

17. The method of claim 13, wherein the UV absorbing formulation further comprises a resin in an amount of from about 10 wt. % to about 50 wt. %.

18. A method of erasing ink comprising:
disposing an ink formulation comprising a reverse photochromic colorant encapsulated in a plurality of capsules on a surface, wherein the plurality of capsules are formed of one or more UV absorbers; and
exposing the surface to UV light,
wherein, after exposing the surface to UV light, the surface has a $\Delta E^*$ value of from about 1 to about 20, a $\Delta L^*$ value of from about 0.1 to about 3, a $\Delta a^*$ value of from about +/−0.5 to about +/−2, a $\Delta b^*$ value of from about +/−0.5 to about +/−5, or any combination thereof.

19. The ink formulation of claim 1, further comprising an activator or bleaching agent.

* * * * *